United States Patent
Huang et al.

(10) Patent No.: US 7,599,049 B2
(45) Date of Patent: Oct. 6, 2009

(54) APPARATUS FOR TESTING LIGHT TRANSMISSION THROUGH LENS

(75) Inventors: Kuan-Te Huang, Taipei Hsien (TW); Yung-Chang Han, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 47 days.

(21) Appl. No.: 11/870,098

(22) Filed: Oct. 10, 2007

(65) Prior Publication Data

US 2008/0165350 A1    Jul. 10, 2008

(30) Foreign Application Priority Data

Jan. 10, 2007    (CN) .................. 2007 1 0200033

(51) Int. Cl.
*G01B 9/00* (2006.01)
(52) U.S. Cl. ..................... 356/124; 356/236
(58) Field of Classification Search ................ 356/124, 356/124.5; 359/642
See application file for complete search history.

(56) References Cited

U.S. PATENT DOCUMENTS 4,120,582 A * 10/1978 De Vries et al. ............... 356/73
7,256,881 B2 * 8/2007 Leppard et al. ............. 356/124
2001/0013572 A1 * 8/2001 Kuderer ................... 250/208.2

FOREIGN PATENT DOCUMENTS

CN    1092167 A    9/1994
CN    1560585 A    1/2005

* cited by examiner

*Primary Examiner*—Tarifur Chowdhury
*Assistant Examiner*—Michael Lapage
(74) *Attorney, Agent, or Firm*—Zhigang Ma

(57) ABSTRACT

An apparatus for testing transmission of a lens includes a light source, a focusing device, an integrating sphere, a moveable carrier, a detector, and a processor. Light, in a specific wavelength range, is emitted from the light source. The focusing device is configured for collimating and focusing the light to transmit the light onto the lens being tested. The integrating sphere is configured for receiving light transmitted through the lens. The moveable carrier is configured for facilitating a relative movement between the lens and the integrating sphere. The detector includes a light sensor configured for detecting a light intensity received by the integrating sphere and transforming the light intensity into a comparing signal for comparison. The processor is configured for comparing a signal of the intensity of the light transmitted to the lens with the comparing signal to obtain a transmission efficiency/percentage of the lens.

13 Claims, 1 Drawing Sheet

APPARATUS FOR TESTING LIGHT TRANSMISSION THROUGH LENS

TECHNICAL FIELD

The present invention relates to light-transmission testing apparatuses and, particularly, to an apparatus for testing the level of light transmission through a given lens.

BACKGROUND

Lenses, for glasses, telescopes, optical microscopes, or cameras, for example, are quite common optical components. Transmission (e.g., often expressed as a ratio of transmission/non-transmission or a ratio of transmission/total available light) of light, especially within specific light wavelengths, is an important index for evaluating the optical characteristics of a lens.

Typically, transmission of a lens is measured using the following method: a light source is positioned on one side of a lens to be tested and a photo multiplier tube (PMT) is positioned on the other side of the lens. When the light source emits light onto the lens, part of the light is transmitted through the lens (with another portion lost to, e.g., reflection and/or attenuation) and is detected by the photo multiplier tube. Transmission of the lens is calculated by comparing the intensity of light incident on the lens with the intensity of light transmitted from the lens. However, the detection rate of the photo multiplier tube is relatively slow, and, as a result, is generally not suitable for testing of lenses in mass production. Therefore, it is desired to develop a rapid testing apparatus for testing of light transmission through lenses.

SUMMARY

In accordance with a present embodiment, an apparatus for testing transmission of a lens includes a light source, a focusing device, an integrating sphere, a moveable carrier, a detector, and a processor. Light in a specific wavelength or, potentially, wavelength range is emitted from the light source. The focusing device is configured for collimating and focusing the light to transmit the light onto the lens being tested. The integrating sphere is configured for receiving light transmitted through the lens. The moveable carrier is configured for facilitating relative movement between the lens and the integrating sphere. The detector includes a light sensor configured for detecting light intensity received by the integrating sphere and for transforming the light intensity into a comparing (i.e., intensity) signal for comparison. The processor is configured for comparing a signal of light intensity transmitted to the lens with the comparing signal to obtain transmission of the lens.

Other advantages and novel features will be drawn from the following detailed description of at least one preferred embodiment, when taken conjunction with the attached drawing.

BRIEF DESCRIPTION OF THE DRAWING

Many aspects of the present apparatus for testing light transmission through a lens can be better understood with reference to the following drawing. The components in the drawing are not necessarily drawn to scale, the emphasis instead being placed upon clearly illustrating the principles of the present apparatus for testing transmission through a lens. Moreover, in the drawing, like reference numerals designate corresponding parts throughout.

DETAILED DESCRIPTION OF THE PREFERRED EMBODIMENT

Figure 1:
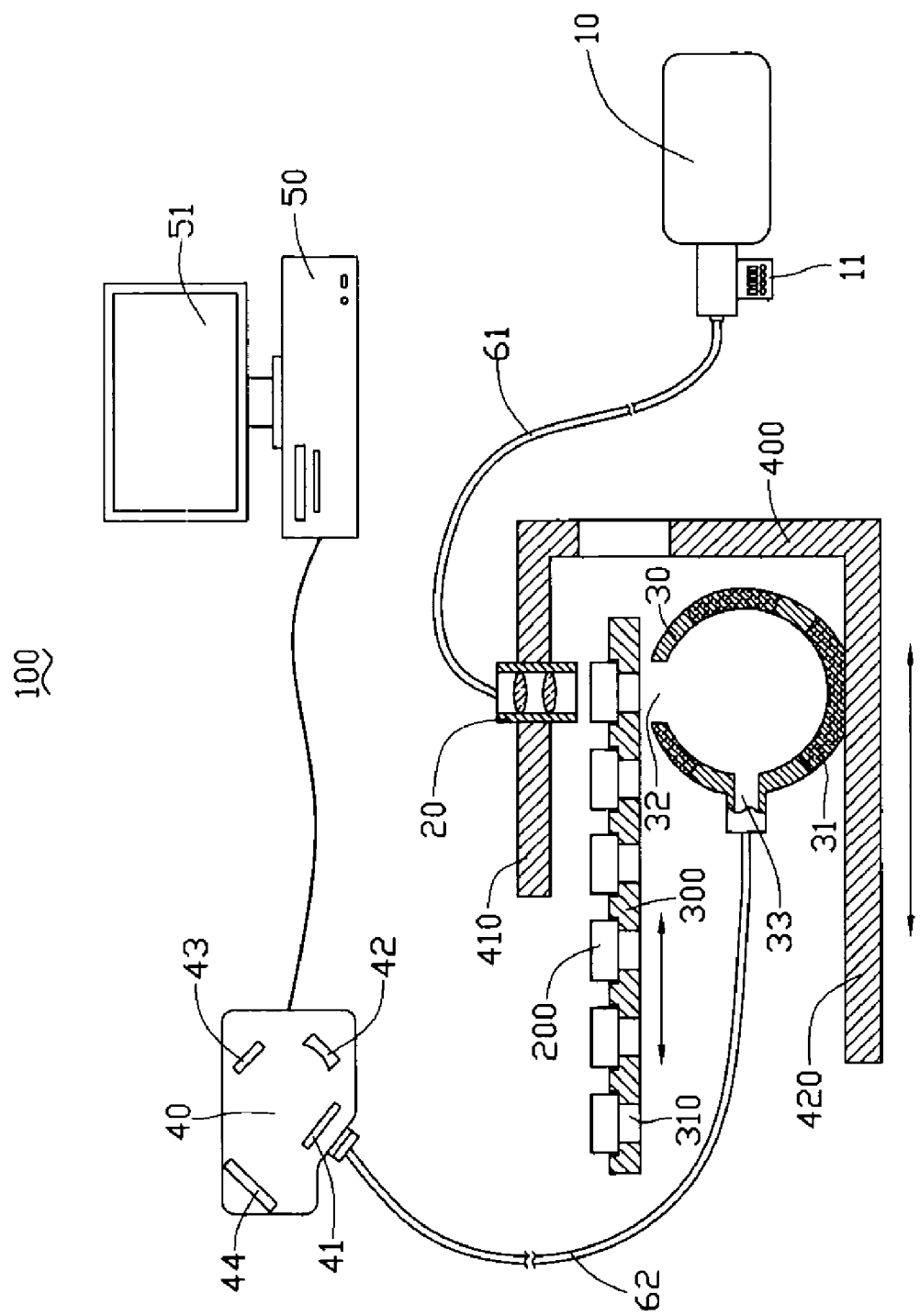
FIG. 1 is a schematic view of an apparatus for testing light transmission through a lens, according to a first present embodiment.

Embodiments of the present apparatus for testing light transmission through a lens will now be described in detail below and with reference to the drawing.

FIG. 1 illustrates a testing apparatus 100 for testing light transmission through a lens 200, in accordance with a first present embodiment. The testing apparatus 100 includes a light source 10, a focusing device 20, an integrating sphere 30, a detector 40, a processor 50, a first carrier 300 for holding the lens 200, and a second carrier 400 for receiving the focusing device 20 and the integrating sphere 30.

The light source 10 can, for example, be a halogen, incandescent, fluorescent, laser or LED lamp, the light source 10 advantageously having an equivalent luminescence of about a 150-watt incandescent light bulb. A controller 11 is disposed in the light source 10. The controller 11 includes an adjuster and a photoelectric sensor. The adjuster is configured for adjusting the wavelength of a first light-radiation emitted from the light source 10. For example, the adjuster adjusts the wavelength of the first light-radiation according to the detection range of the detector 40. In this embodiment, the wavelength ranges approximately from 200 to 1100 nanometers. The photoelectric sensor, configured (i.e., structured and arranged) for detecting the light intensity of the first light-radiation, can, for example, be a charged coupled device (CCD) or a metal-oxide-semiconductor (CMOS).

The focusing device 20 usefully includes a collimating lens and a focusing lens, in succession, with the collimating lens positioned closer to the light source 10. The focusing device 20 is located opposite to the lens 200 and optically coupled with the light source 10 by a first light-radiation conductor 61. The first light-radiation conductor 61, opportunely, is both flexible and has a considerable length to permit a large degree of freedom in positioning the light source 10 relative to the focusing device 20. Specifically, the focusing device 20 is positioned in the optical path between the light source 10 and the lens 200. The first light-radiation conductor 61, for example, an optical fiber, conducts/transmits the first light-radiation emitted from the light source 10 to the focusing device 20. The first light-radiation is collimated to form parallel waves of light radiation by the collimating lens and then focused by the focusing lens for transmission to the lens 200.

The integrating sphere 30 is a hollow sphere with an inner diameter in an approximate range from 50~60 millimeters. The interior surface of the integrating sphere 30 is coated with a reflective layer 31. The integrating sphere 30 has a sampling port 32 and an exit port 33. The sampling port 32, with a diameter in an approximate range from 10~12 millimeters, is aligned with the lens 200 and the focusing device 20. The sampling port 32 is configured for receiving a second light-radiation (i.e., having a same frequency as the first light-radiation but likely of lower intensity due to loss caused by the lens 200) transmitted from/through the lens 200. The exit port 33, with a diameter in an approximate range from 10~12 millimeters, is disposed perpendicular to the sampling port 32. The second light-radiation transmitted from the lens 200 is completely received through the sampling port 32 and transmitted to the exit port 33 after reflections by the interior surface of the integrating sphere 30. The second light-radiation finally enters the second light-radiation conductor 62

(e.g., an extended and flexible optical fiber) as a result of the light-channeling capability of the integrating sphere 30.

The first moveable carrier 300 provides a plurality of T-shaped holes 310 configured for receiving the respective lenses 200. The second moveable carrier 400 has a first holder 410 and a second holder 420 disposed opposite to the first holder 410. The focusing device 20 is disposed in the first holder 410. The integrating sphere 30 is disposed in the second holder 420. The first moveable carrier 300 and the second moveable carrier 400 are, beneficially, in the form of an X-Y table or an X-Y-θ table in order to facilitate positioning thereof, especially to accommodate testing of an array of respective lenses 200. Further, the first moveable carrier 300 and the second moveable carrier 400 are respectively moved and controlled by a predetermined control program configured for separately moving and positioning the lens 200, the focusing device 20, and the integrating sphere 30. The predetermined control program facilitates a relative movement between the first moveable carrier 300 and the second moveable carrier 400, i.e., the second moveable carrier 400 may keep still if the first moveable carrier 300 moves, and vice versa. The testing lenses 200 are thus measured consecutively by the testing apparatus 100.

The detector 40 includes a filter 41, a focusing lens 42, a reflecting lens 43, and a light sensor 44. The light sensor 44 is advantageously selected from a CCD and a CMOS with a 3648-pixel resolution. The second light-radiation received by the integrating sphere 30 is conducted to the detector 40 by the second light-radiation conductor 62 and then split into different colors of light by the filter 41. The split-color second light-radiation is then focused by the focusing lens 42 and reflected to the light sensor 44 by the reflection lens 43 for transforming the second light-radiation to an electrical comparing (i.e., intensity) signal. Finally, the comparing signal is outputted by the light sensor 44.

The processor 50 is electrically connected with the detector 40 and is configured and programmed for comparing the light intensity transmitted to the lens 200 (in the present embodiments, it is the intensity of the first light-radiation emitted from the light source 10) with the comparing signal outputted by the light sensor 44, which is equivalent to the second light-radiation transmitted from a respective lens 200. The result of the comparison of the intensities of the first and second light-radiations is advantageously expressed ratio of the comparing signal value to the initial intensity of the first light radiation (i.e., the transmission efficiency/percentage). Usefully, the processor 50 may further connect to, e.g., a display interface 51, a printer (not shown), and/or an e-mail server (not shown) for outputting the test results of the respective lenses 200.

Because the focusing device 20 is connected to the light source 10 by the extendable/flexible first light-radiation conductor 61 and the integrating sphere 30 is connected to the detector 40 by the extendable/flexible second light-radiation conductor 62, the light source 10 and the detector 40 can be set at reasonably random locations, according to different schemes. In this manner, the testing apparatus 100 is flexible for expanding and easy for maintaining. The testing apparatus 100 uses the integrating sphere 30 to completely receive (i.e., thereby fully account for) light transmitted (i.e., the second light-radiation) from a given test lens 200. In addition, the detector 40 employs CCD or CMOS to shorten the testing time of a given lens 200. Accordingly, the testing apparatus 100, incorporating the moveable first carrier 300 and the moveable second carrier 400, allows the testing apparatus 100 to automatically and rapidly test the lenses 200. The average amount of time used to measure the transmission of a lens can be below 0.1 seconds.

It is reasonable that the testing apparatus 100 could employ only one moveable carrier to achieve the same purpose. The second moveable carrier 400 could be saved by placing the focusing device 20 and the integrating sphere 30 in/on a fixed stage (e.g., a non-moveable version of the second carrier 400). In a similar manner, the first moveable carrier 300 could be saved by placing the test lens 200 in a fixed holder, while still using a second carrier 400 that is moveable. Both ways can achieve the same purpose of facilitating a relative movement between a given lens 200 and the integrating sphere 30.

Furthermore, the testing apparatus 100 can be assembled within lens production equipment to facilitate a continuous production flow of lens testing and lens assembly, in succession.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An apparatus for testing transmission of a lens, the apparatus comprising:
   a light source configured for emitting a first light-radiation in a specific wavelength range and comprising a photoelectric sensor configured for detecting the light intensity of the first light-radiation as a referring signal;
   a focusing device configured for collimating and transmitting the first light-radiation to the lens;
   an integrating sphere comprising a sampling port aligned with the lens for receiving a second light-radiation transmitted from the lens and an exit port disposed perpendicular to the sampling port;
   a moveable carrier for enabling the lens to move relative to the focusing device and the integrating sphere;
   a detector for transforming a light intensity of the second light-radiation conducted from the exit port to a comparing signal; and
   a processor configured for comparing the referring signal with the comparing signal to calculate a transmission efficiency of the lens being tested.

2. The apparatus as claimed in claim 1, wherein the apparatus further comprises a first light-radiation conductor having an extended and flexible length, the first light-radiation conductor connecting the light source with the focusing device and being configured for conducting the first light-radiation emitted from the light source to the focusing device.

3. The apparatus as claimed in claim 2, wherein the first light-radiation conductor is an optical fiber.

4. The apparatus as claimed in claim 1, wherein the light source is selected from the group consisting of a halogen lamp, an incandescent lamp, a fluorescent lamp, a laser, and a LED lamp.

5. The apparatus as claimed in claim 1, wherein the detector includes a light sensor configured for detecting a light intensity of the second light-radiation.

6. The apparatus as claimed in claim 5, wherein the light sensor is selected from a CCD and a CMOS device.

7. The apparatus as claimed in claim 1, wherein the light source includes an adjuster configured for adjusting the wavelength of the first light-radiation.

8. The apparatus as claimed in claim 1, wherein the integrating sphere has an approximate inner diameter ranging from 50~60 millimeters and defines a sampling port located opposite to the lens, the sampling port having an approximate diameter from 10~12 millimeters.

9. The apparatus as claimed in claim 1, wherein the apparatus further comprises a second light-radiation conductor having an extended and flexible length, the integrating sphere defining an exit port, the second light-radiation conductor being configured for connecting the detector with the exit port of the integrating sphere.

10. The apparatus as claimed in claim 1, wherein the moveable carrier is controlled by a predetermined control program configured for moving and positioning the lens.

11. The apparatus as claimed in claim 1, wherein the apparatus is further configured for accommodating a plurality of lenses, the moveable carrier providing a plurality of holes configured for receiving the plurality of lenses.

12. The apparatus as claimed in claim 1, wherein the moveable carrier has a first holder and a second holder disposed opposite to the first holder, and the focusing device is disposed in the first holder.

13. The apparatus as claimed in claim 12, wherein the integrating sphere is disposed in the second holder.

* * * * *